(12) United States Patent
Harari et al.

(10) Patent No.: US 9,916,336 B2
(45) Date of Patent: Mar. 13, 2018

(54) TREE-SEARCH TEMPORAL-MISS HANDLING

(71) Applicant: Freescale Semiconductor Inc., Austin, TX (US)

(72) Inventors: Yuval Harari, Tel-Aviv (IL); Evgeni Ginzburg, Petah Tikva (IL); Adi Katz, Ramat Gan (IL); Shai Koren, Raanana (IL)

(73) Assignee: NXP USA, Inc., Austin, TX (US)

( * ) Notice: Subject to any disclaimer, the term of this patent is extended or adjusted under 35 U.S.C. 154(b) by 346 days.

(21) Appl. No.: 14/859,329

(22) Filed: Sep. 20, 2015

(65) Prior Publication Data

US 2017/0083554 A1   Mar. 23, 2017

(51) Int. Cl.
*G06F 17/30* (2006.01)
*G06F 15/16* (2006.01)

(52) U.S. Cl.
CPC .. *G06F 17/30327* (2013.01); *G06F 17/30377* (2013.01); *G06F 17/30477* (2013.01)

(58) Field of Classification Search
None
See application file for complete search history.

(56) References Cited

U.S. PATENT DOCUMENTS

| 7,036,125 B2 | 4/2006 | Basso et al. |
| 9,141,656 B1 * | 9/2015 | Lopyrev ........... G06F 17/30321 |
| 2007/0245312 A1 * | 10/2007 | Qadeer ............... G06F 11/3632 717/124 |

* cited by examiner

*Primary Examiner* — Alex Gofman

(57) ABSTRACT

A temporal-miss handler includes updating a data leaf in a tree-structured database of a communications processor with a plurality of threads. A search for the data leaf includes generating at least one search result for one of the plurality of threads. A sufficiency of a temporal separation, between updating the data leaf and searching for the data leaf, to retrieve the data leaf is determined. Each search result is cleared when the temporal separation is insufficient. A new search is performed when the temporal separation is insufficient.

20 Claims, 10 Drawing Sheets

TREE-SEARCH TEMPORAL-MISS HANDLING

FIELD

This disclosure relates generally to data access in a multi-threaded system, and more specifically to overcoming temporal incoherency when accessing a data leaf in a multi-threaded tree-structured database.

BACKGROUND

A tree-structured database includes a multitude of interconnected nodes, beginning with a single root node. The root node connects to at least two other nodes, each of which may be connected to more nodes or may terminate with a connection to data leaves. The final interconnected node that connects to data leaves is referred to as a result node. A multi-threaded system will traverse the database from the root node to a data leaf with a variety of methods (e.g. in-order, post-order or level-order).

Multi-threaded systems must reliably retrieve data from a data leaf while the same data is being concurrently updated by another thread. The threads used to retrieve and to update the data leaf, each may include multiple operations of queries on tree nodes and leaves, with potentially long periods of concurrent updating and searching. A temporal miss occurs when the multi-threaded system using the shared database has a race condition between the data being updated and the data being retrieved.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
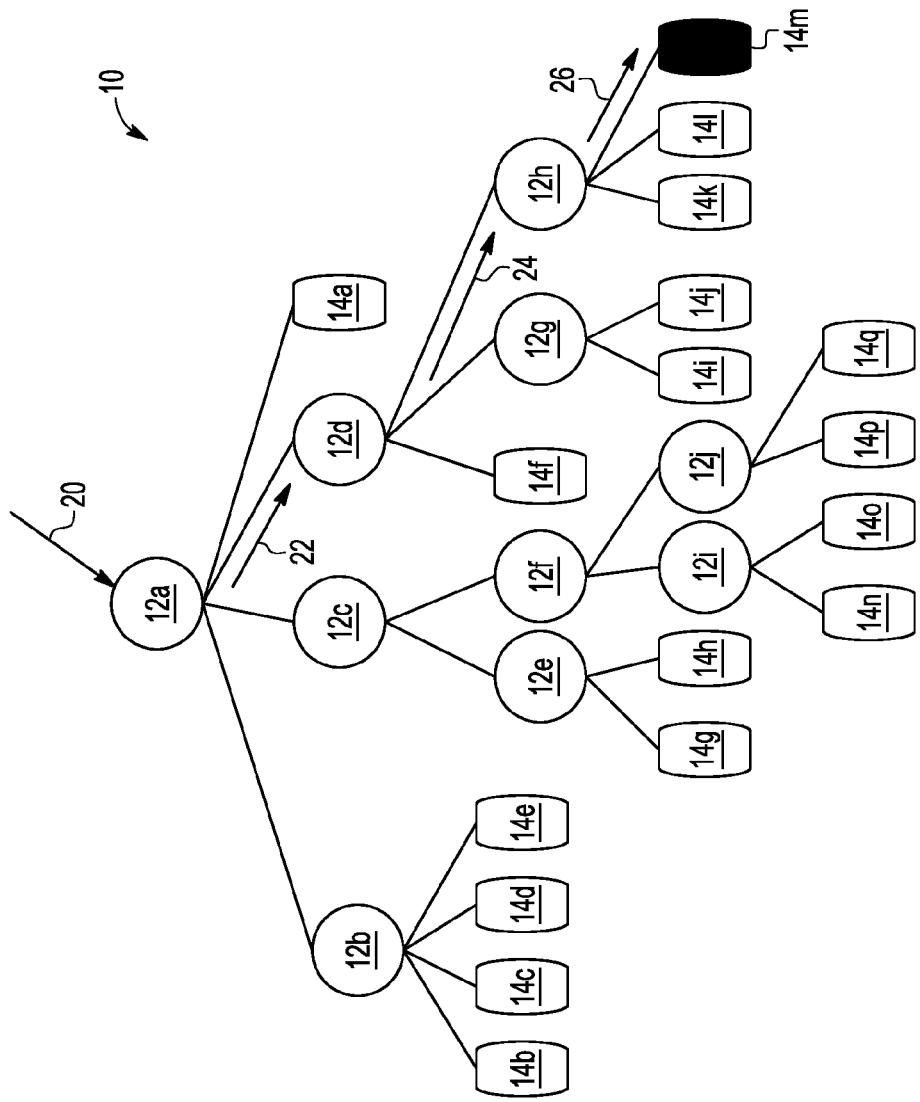
FIG. 1 is schematic view of a search for a data leaf in a tree-structured database.

Embodiments of systems and methods described herein provide for the efficient handling of temporal incoherency of data leaf entries in a tree-structured database, without the need for extended locking periods. A lookup or algorithmic search engine, (Longest Prefix Match (LPM) for example), evaluates a final search result for a data leaf to determine if the data is sufficiently stable to be retrieved. If the data is not stable (e.g. a "faulty miss"), the search engine conditionally restarts the search if a number of searches have not exceeded a limit. New searches are performed for the same leaf in one embodiment, and a different leaf in another embodiment. In another embodiment system overhead will be incurred, when the number of searches has exceeded the limit. For example, additional input or output (I/O) operations can occur, software can be interrupted, additional software operations can be required, or any combination thereof. In another embodiment, predefined actions are performed when the number of searches exceeds the limit—for example, a flag is set or a fail counter is incremented.

The procedures for handling temporal incoherency of data leaf entries can be autonomous, without intervention or knowledge by system components at a higher architectural level. Database structures, other than a tree-structured database, that include multiple threads with concurrent updating and searching for data, are considered within the scope and spirit of this disclosure. As systems, (including without limit, mobile platforms, desktop computers and servers), rely more extensively on multi-threaded data management, the benefits of efficient temporal-miss handling increase. Managing database conflicts through a predetermined restart procedure, rather than relying on an extended database locking, provides a reduction in system clock cycles, system power and a more deterministic handling of temporal incoherency.

The handling of temporal incoherency described herein is ideally suited for systems where an underlying database must be accessed (including data updates and retrieval) with autonomy from higher-level system operations. For example, a Layerscape architecture, such as the LS2080 communications processor from Freescale Semiconductor, Inc., uses a hierarchical structure with multiple processor cores (e.g. Power Architecture® or ARM®) whose programming can be optimized and reused independent from the implementation of lower level functions. Indeed, these lower level functions can be implemented as hardware accelerators or as software modules without affecting the higher level coding or operation. Accordingly, system developers will retain the benefits of portable software development, platform ubiquity and hardware independence without sacrificing the performance of lower level functions, for example compression algorithms or accelerators.

One lower level function of the LS2080 multi-core processor, which benefits from the disclosed handling of temporal incoherency, is a Classifier and Table Lookup Unit (CTLU). The CTLU includes several main components, one of which is the portable classifier. The portable classifier is used to parse frame headers from a communications network, generate a key, and perform basic table lookup by performing an exact match on the key. Data stored in the tree-structured database includes a frame checksum in one example.

The term "retrieve" as used within the context of this disclosure includes accessing or reading data in a data leaf. Updating the data leaf includes without limit, writing a same or different data value, deleting or relocating the data leaf. For example, a tree-structured database further organized as a binary search tree, will require rebalancing to minimize the time required to perform a binary search. In one example, when data is inserted into a data leaf, a valid bit is set to false until the insertion sequence is complete and the data can be reliably retrieved without concern for violating setup and hold times on registers and the like. Other methods of ensuring sufficient temporal separation between updating a data leaf are envisioned, including ensuring a minimum asynchronous delay between updating and searching for the data leaf.

FIG. 1 shows a search for a data leaf in a tree-structured database 10. The database is organized with a plurality of nodes 12a through 12j (generally 12) and a plurality of data leaves 14a through 14q (generally 14). A root node 12a connects to at least two other nodes, (e.g. 12b, 12c and 12d). The root node can also connect directly to a data leaf 14a. Each node connected to the root node 12a can also connect to other nodes, thus forming a subtree. For example, node 12c connects to node 12e and node 12f, with node 12c being the root node for the subtree under root node 12a. The final node in a search path then connects to data leaves, one of which is the data leaf being searched or updated (e.g. the result node). For example, if the result data leaf 14m is searched, then node 12h is the result node.

The tree-structured database 10 can be traversed in a variety of ways (e.g. in-order, post-order or level-order). In one embodiment, each node 12 includes a key. The key for each node must be greater than any keys in subtrees on the left and less than any keys in subtrees on the right. By comparing the keys at each node along a search path from the root node 12a to the result node 12h having the result data leaf 14m, the tree is traversed. For example, a search of the tree-structured database 10 on FIG. 1 for the result data leaf 14m begins with a first query 20 to the root node 12a. The search proceeds with a second query 22 to node 12d, a third query 24 to the result node 12h and a fourth query 26 to the result data leaf 14m. At each node 12, a key within the respective node is compared with an address of a leaf that is being searched, to determine the next node or leaf to transition towards.

Figure 2:
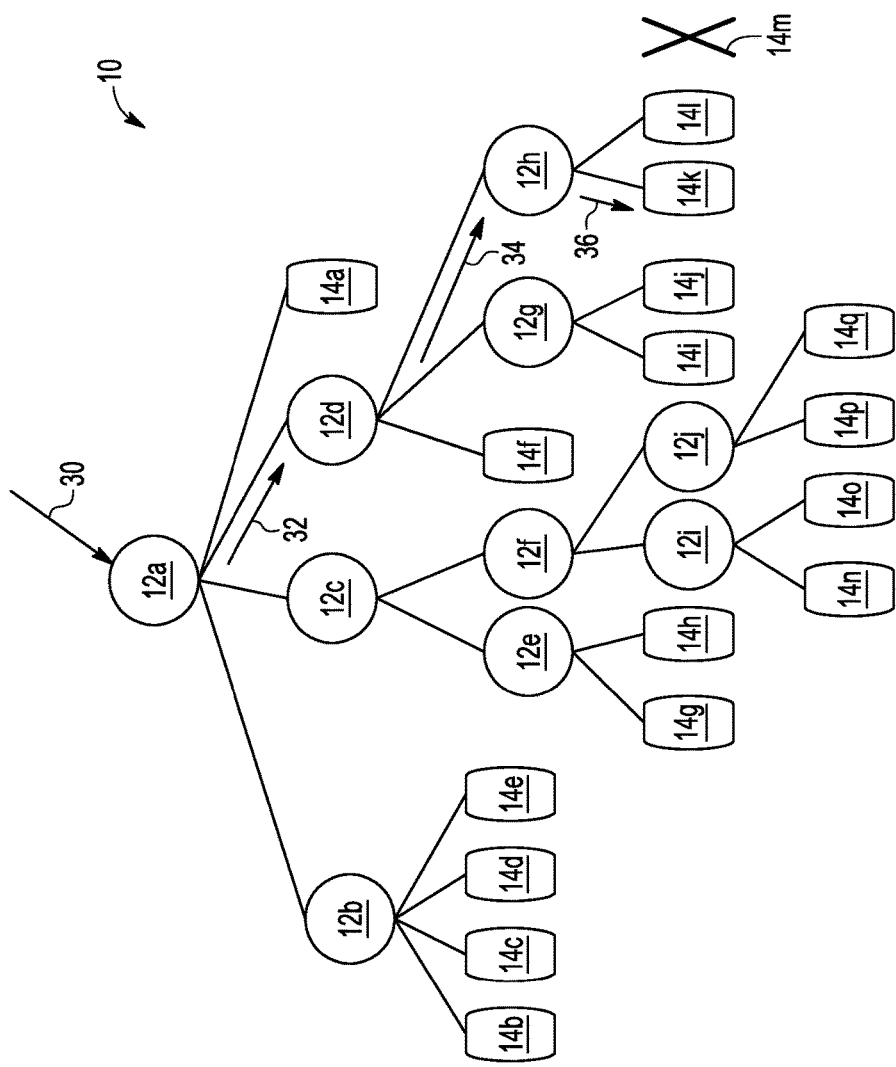
FIG. 2 is a schematic view of a subsequent search for a new data leaf in the tree-structured database of FIG. 1.

Due to a race condition between updating and searching for the result data leaf 14m, the result data leaf 14m cannot be retrieved. Specifically, the existence of the result data leaf 14m is validated by the keys at each node used to search for the result data leaf 14m, however the result data leaf 14m is not valid because (in one example) a corresponding valid bit is cleared. At a later time, the result data leaf 14m will be stable and the corresponding valid bit will then be set. During this period wherein the result data leaf 14m location exists but the data is unstable, a race condition occurs. The race condition causes a temporal incoherency, or a temporal separation between updating the result data leaf 14m and searching for the same result data leaf 14m, where the separation is insufficient to retrieve the result data leaf 14m. Following the failed search of FIG. 1, due to the inconsistency of the database 10 (e.g. the inconsistency of a leaf existing, but not being stable or being subject to modification), a thread restart is triggered, and additional query iterations are performed as shown in FIG. 2. Generally, for most database structures, (except those having very few nodes and leafs), the identification of a database inconsistency and the subsequent need to search again is a rare event. Accordingly, other search methods that rely on locking the database, (or even a portion of the database), significantly limit the utility of the database.

In one embodiment following the thread restart, a first query 30 is made to root node 12a, followed by a second query 32 to node 12d, and a third query 34 to node 12h. In contrast to the search shown in FIG. 1 where the search for the result data leaf 14m failed due to a temporal incoherency, a search for a new result data leaf 14k is successfully performed with a fourth query 36. In one example, a search for a new result data leaf 14k is performed, rather than repeating the search for the result data leaf 14m from the first search, because the delay in retrieving the result data leaf 14m renders the data leaf 14m unusable for the purpose for which it was sought. In another example, the result data leaf 14m and the new result data leaf 14k are interchangeable because the order in which they are accessed is arbitrary. In another example, the thread restart searches for the same result data leaf 14m with success, because sufficient time has elapsed between the end of the first search and the thread restart to allow the result data leaf to be retrieved.

Figure 3:
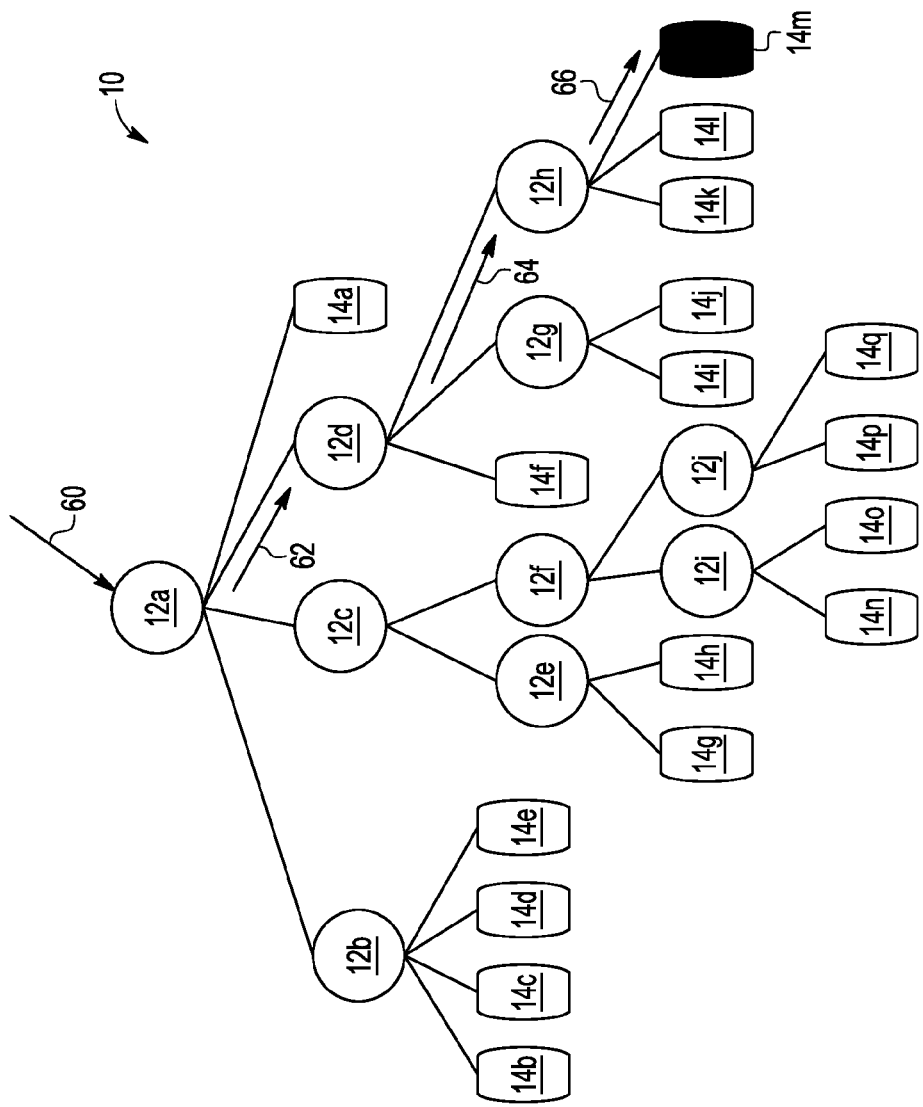
FIG. 3 is a schematic view of a subsequent search for the same data leaf in the tree-structured database of FIG. 1.

FIG. 3 shows another example of a thread restart following the failed search shown in FIG. 1. In FIG. 3, a first query 60 is made to the root node 12a, followed by a second query 62 to node 12d, a third query 64 to the result node 12h and a fourth query 66 to the result data leaf 14m. Similar to the search shown in FIG. 1, the search for the result data leaf 14m fails again due to a temporal incoherency or race condition between updating and searching for the result data leaf 14m.

In one embodiment, prior to the thread restart of FIG. 2 or FIG. 3, a stopping criterion is evaluated to determine if further searches and additional actions should be performed. In other embodiments, the stopping criterion is evaluated after one or more thread restarts have been performed. In one example, the stopping criterion is a limit on the number of failed search attempts. If the number of failed search attempts exceeds a limit, the search is stopped and other overhead operations are executed, including without limit performing addition input/output (I/O) operations, interrupting software and performing additional software operations. In another embodiment, the stopping criterion is replaced with a plurality of criteria, including for example, a limit on the number of failed search attempts and a number of previous occurrences of the number being exceeded.

Figure 4:
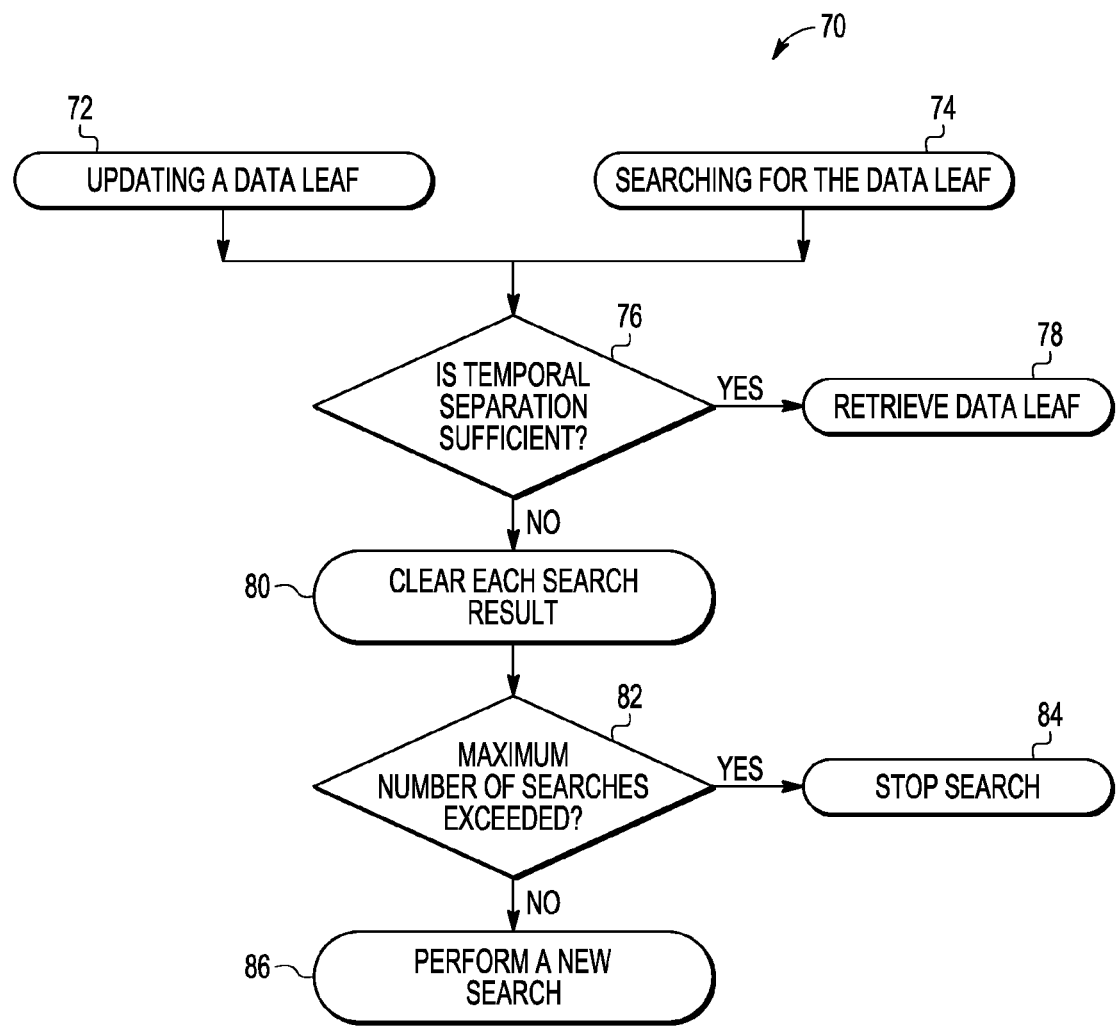
FIG. 4 is a flowchart representation of a method for temporal-miss handling for the search shown in FIG. 1, FIG. 2 and FIG. 3.

FIG. 4 shows a method 70 for temporal-miss handling usable in the embodiment shown in FIG. 1, FIG. 2 and FIG. 3. The method 70 begins with updating a data leaf at 72. The data leaf is searched at 74. Updating 72 and searching 74 can occur concurrently, overlapped in time or as sequential events. The sufficiency of a temporal separation (between updating the data leaf and searching for the data leaf) is evaluated at 76. If the temporal separation is sufficient, the data leaf is retrieved at 78, otherwise each search result is cleared at 80. Each node that is queried (for example queries 20, 22, 24 and 26 in FIG. 1) includes a search result to define the path from the root node 12a to the result data leaf 14m in the example shown in FIG. 1. The stopping criteria (or criterion) is evaluated at 82. Specifically, if a maximum number of searches is exceeded, the search is stopped at 84, otherwise a new search is performed at 86 (e.g. a thread restart).

Figure 5:
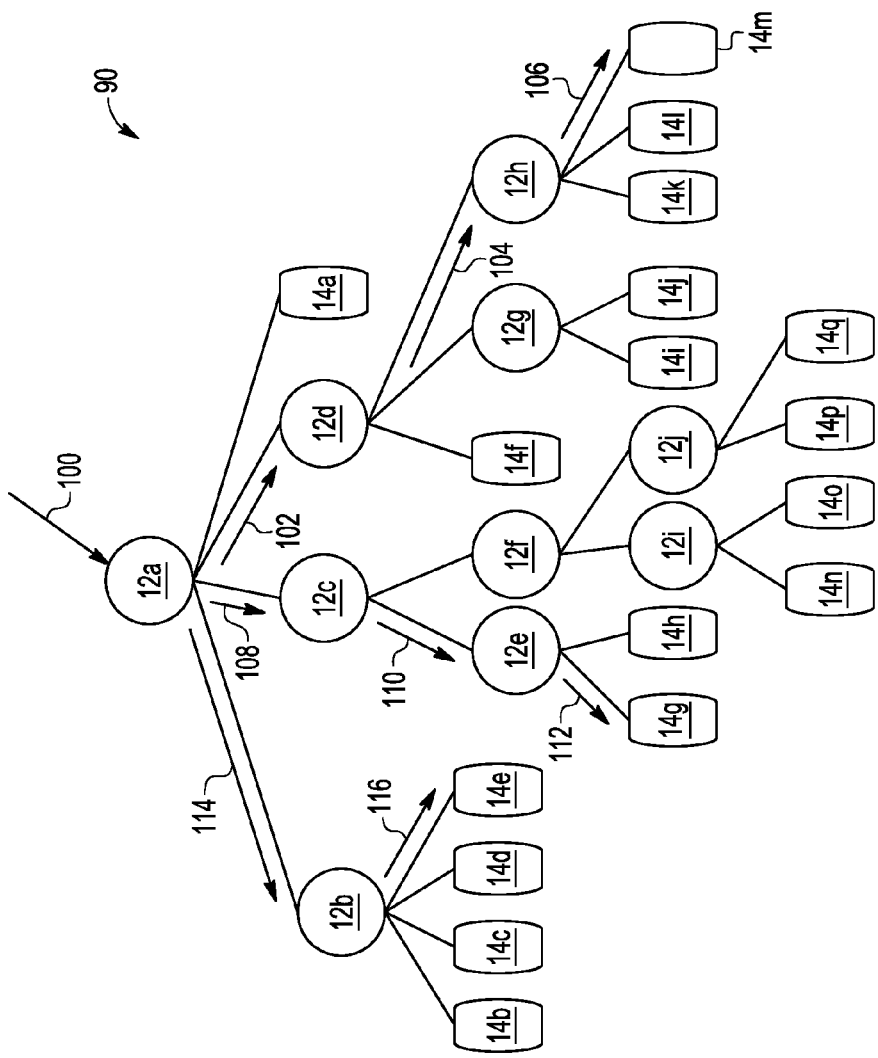
FIG. 5 is a schematic view of a recursive search for data leaves in a tree-structured database.
Figure 6:
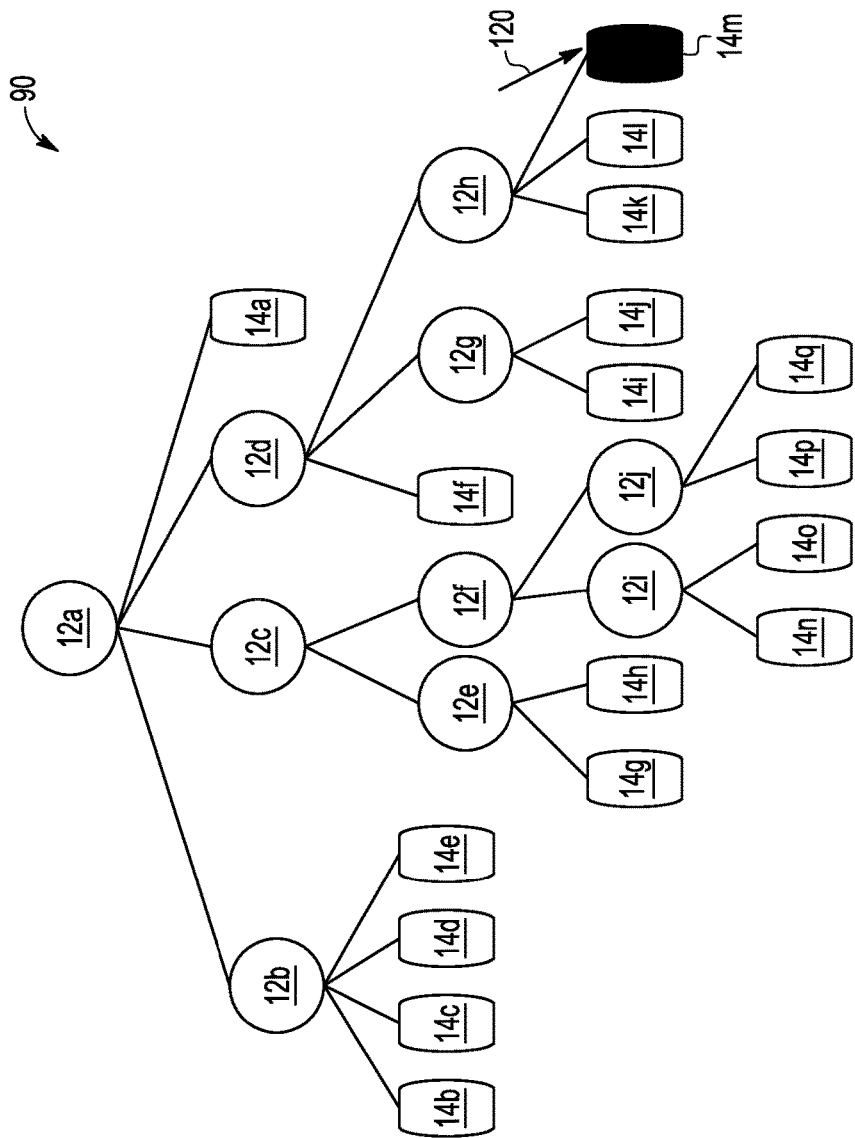
FIG. 6 is a schematic view of a subsequent search for a data leaf found in the search shown in FIG. 5.

FIG. 5, FIG. 6, FIG. 7 and FIG. 8 show an embodiment 90 using a recursive search thread. With reference to FIG. 5, the recursive search begins with a first query 100 to the root node 12a. A second query 102 is made to node 12d, a third query 104 to node 12h and a fourth query 106 to a first result data leaf 14m. Other result data leaves are then searched as suitable candidates in addition to the first result data leaf 14m. A fifth query 108 is made to node 12c, a sixth query 110 is made to node 12e and a seventh query 112 is made to a second result data leaf 14g. An eighth query 114 is made to node 12b and a ninth query 116 is made to a third result data leaf 14e. In other embodiments, the number of result data leaves will vary and need not be constrained to three result data leaves. In FIG. 6, an attempt to retrieve the first result data leaf 14*m* with a tenth query 120 fails due to a temporal incoherency between updating and searching the first result data leaf 14*m*.

Figure 7:
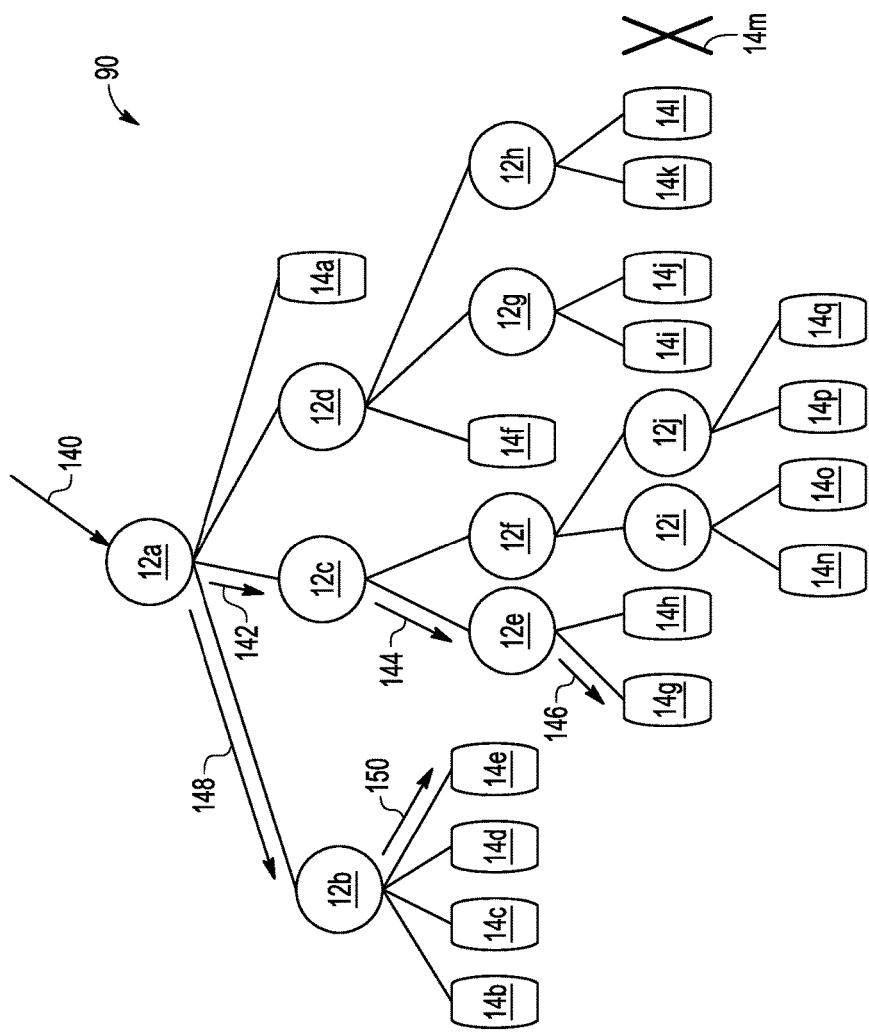
FIG. 7 is a schematic view of a recursive search for data leaves in a tree-structured database, excluding the data leaf that was searched in FIG. 6.
Figure 8:
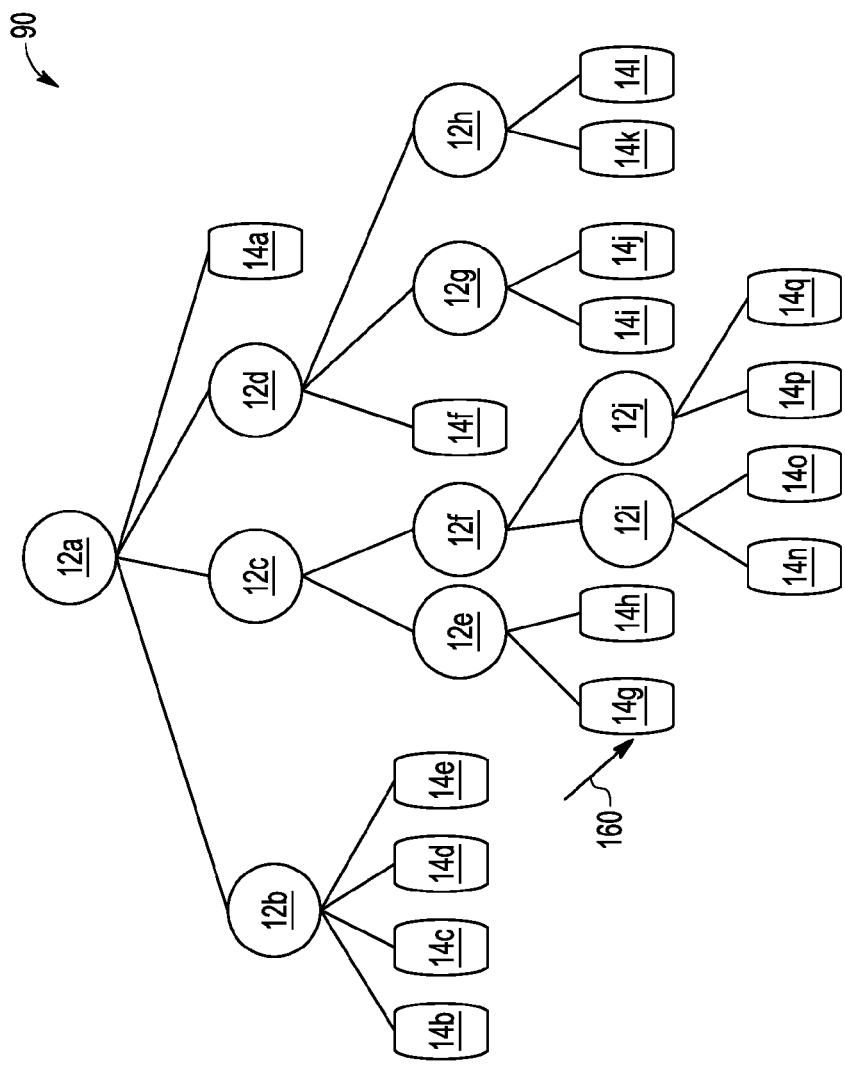
FIG. 8 is a schematic view of a subsequent search for a data leaf found in the search shown in FIG. 7.

FIG. 7 shows a new recursive search after a thread restart, where all result data leaf candidates are searched with the exception of the first result data leaf 14*m*, shown by an "X" because it failed the first search (FIG. 5 and FIG. 6). An eleventh query 140 is made to the root node 140. A twelfth query 142 is made to node 12*c*, a thirteenth query 144 is made to node 12*e* and a fourteenth query 146 is made to the second result data leaf 14*g*. A fifteenth query 148 is made to node 12*b* and a sixteenth 150 query is made to the third result data leaf 14*e*. In FIG. 8, an attempt to retrieve the second result data leaf 14*g* with a seventeenth query 160 succeeds, in contrast to the tenth query to the first result data leaf 14*m* shown in FIG. 6. In another embodiment, the third result data leaf 14*e* is searched instead of the second result data leaf 14*g*. In another embodiment, a second search attempt is made for the first result data leaf 14*m* with stopping criteria being evaluated to limit the number of unsuccessful thread restarts.

Figure 9:
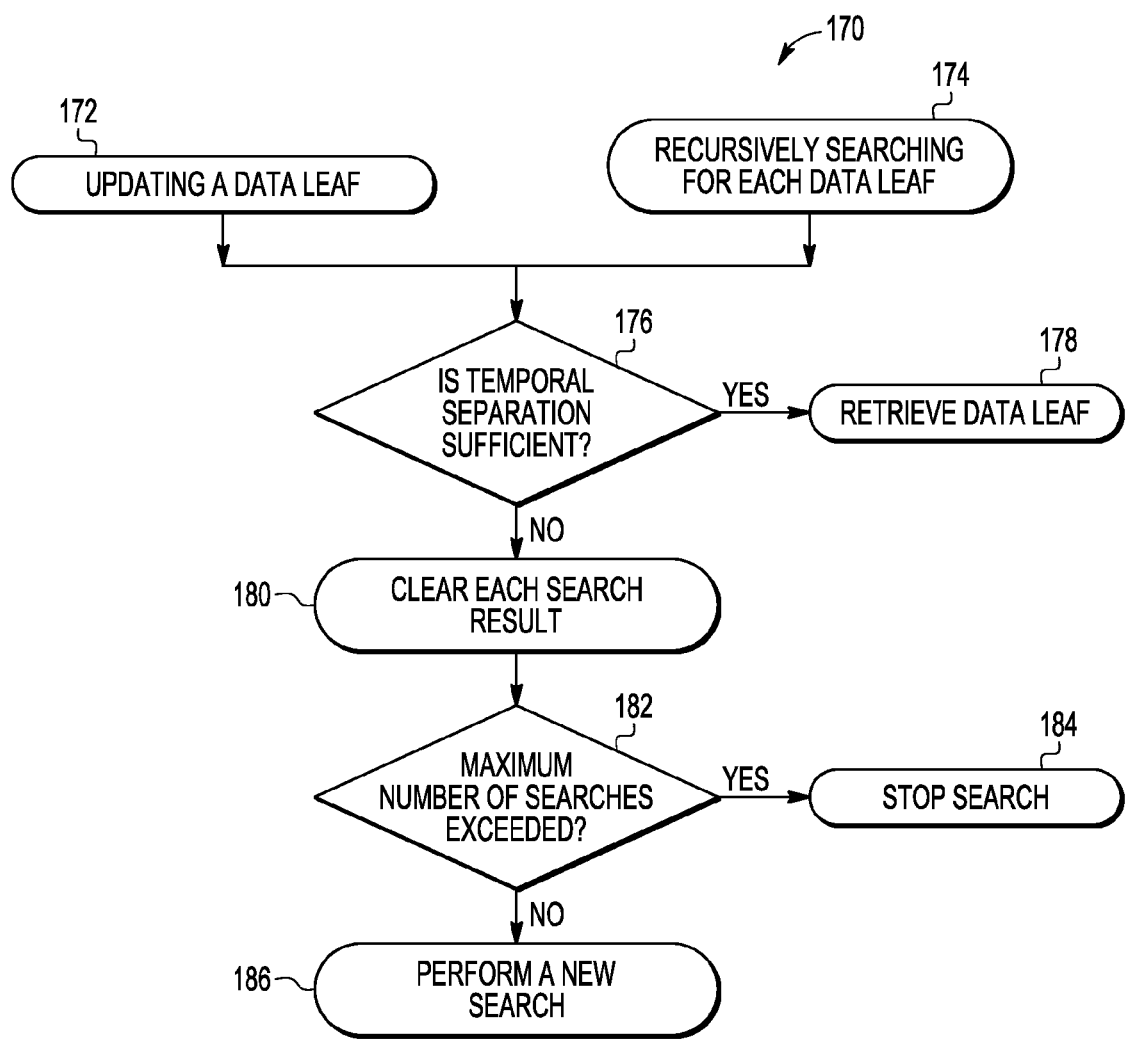
FIG. 9 is a flowchart representation of a method for temporal-miss handling for the recursive search shown in FIG. 5, FIG. 6, FIG. 7 and FIG. 8.

FIG. 9 shows a method 170 for temporal-miss handling usable in the embodiment shown in FIG. 5, FIG. 6, FIG. 7 and FIG. 8. The method 170 begins with updating a data leaf at 172. Each of the data leaf candidates is recursively searched at 174. Updating 172 and recursively searching 174 can occur concurrently, overlapped in time or as sequential events. The sufficiency of a temporal separation (between updating the data leaf and retrieving one of the result data leaves that was searched) is evaluated at 176. If the temporal separation is sufficient, the result data leaf is retrieved at 178, otherwise each search result is cleared at 80. Each node that is queried includes a search result to define the path from the root node 12*a* to one of the result data leaf 14*m*, 14*g* and 14*e* in the example shown in FIG. 5. The stopping criteria (or criterion) is evaluated at 182. Specifically, if a maximum number of searches is exceeded, the search is stopped at 184, otherwise a new search is performed at 186 (e.g. a thread restart).

Figure 10:
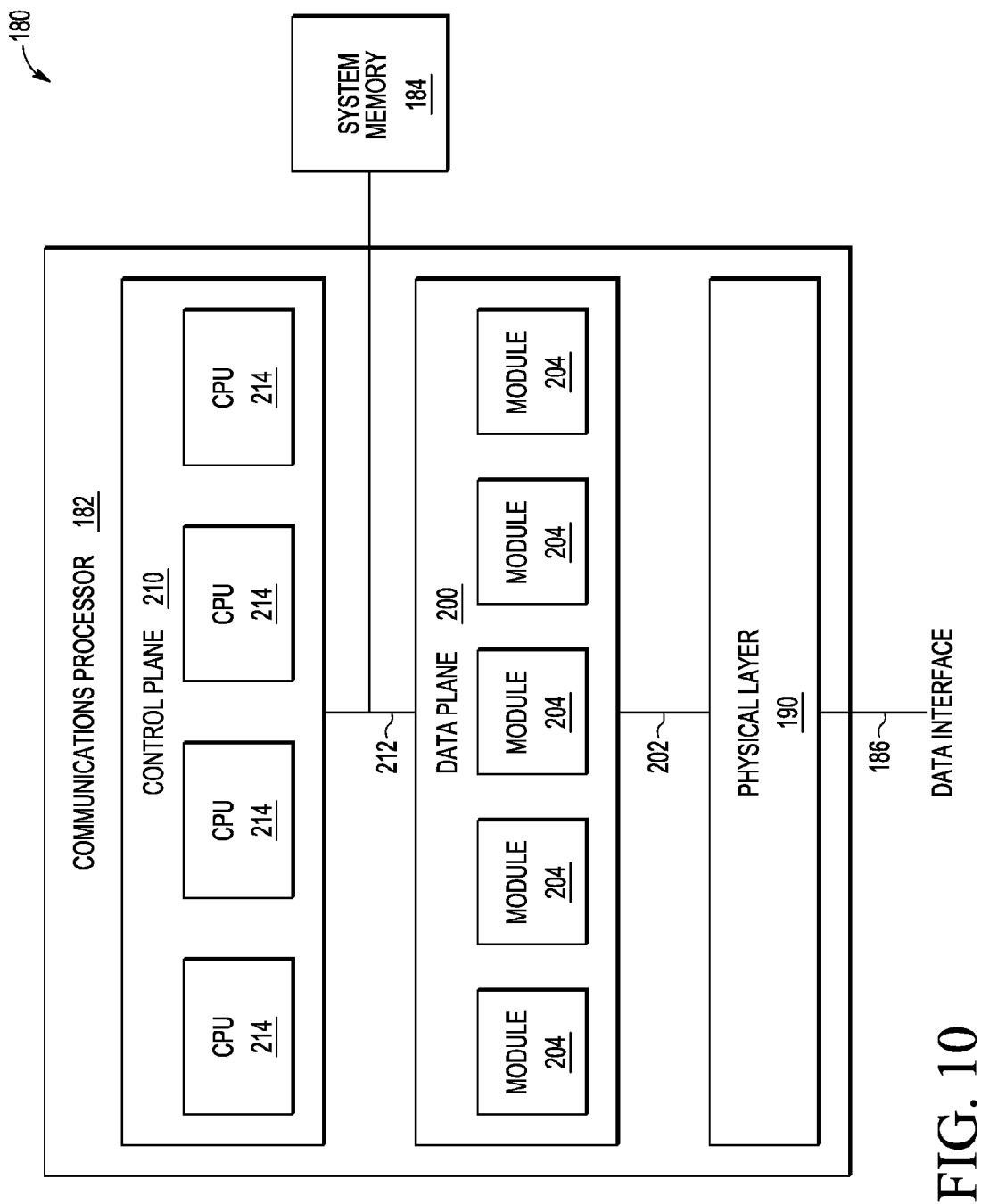
FIG. 10 is a schematic view of an embodiment of a networking system with a communications processor.

FIG. 10 shows an embodiment 180 of a networking system having a communications processor 182, a system memory 184 and a data interface 186. Examples of a networking system include routers, data/voice switches and wireless base stations. The data interface provides data that is received by a physical layer 190, (nonlimiting examples include a SerDes interface, a RapidIO® interface or a PCI Express® interface).

A data plane 200 receives data from the physical layer 190 over an interface 202. The data plane includes one or more modules 204 including for example combinations of packet processors, accelerators or functions implemented by general purpose processors, optimized for traffic flow management. Further examples of data plane 200 functions include Media Access Control (MAC) to perform serial to parallel conversion, media synchronization and transfers into the system memory 184. Other examples of data plane 200 functions include data parsing to forward and classify information to determine how the parsed data should be subsequently processed.

A control plane 210 received data from the data plane 200 over an interface 212. In some embodiments, the control plane 210 also received data directly from the physical layer 190. The control plane 210 includes one or more Central Processing Units (CPU) 214 for communications and maintenance functions. In some embodiments, certain control plane 210 functions and data plane 200 functions are shared, when network traffic flow is maintained without speed degradation. In some embodiments, the control plane 210 includes data cache and memory control for each respective CPU 214. Access to the shared system memory 184 from either the control plane 210, the data plane 200, or both, requires coherency to be maintained between updating and accessing data in the memory 184. In one embodiment, maintaining coherency includes using a tree-structured database. Advantageously, the teachings of this disclosure address the need for temporal-miss handling in a tree-structured database, without the need for database locking, thereby providing a reduction in system clock cycles, system power and a more deterministic handling of temporal incoherency.

As will be appreciated, embodiments as disclosed include at least the following. In one embodiment, a method for temporal-miss handling comprises updating a data leaf in a tree-structured database of a communications processor with a plurality of threads. A data leaf is searched by generating at least one search result for one of the plurality of threads. A sufficiency of a temporal separation, between updating the data leaf and searching for the data leaf, to retrieve the data leaf is determined. Each search result is cleared when the temporal separation is insufficient. A new search is performed when the temporal separation is insufficient.

Alternative embodiments of the method for temporal-miss handling include one of the following features, or any combination thereof. A valid bit is set to a true state after the temporal separation is sufficient to retrieve the data leaf. Generating at least one search result includes comparing a sorting key, at one of a plurality of nodes in the tree database, with another sorting key in a subtree of the tree-structured database. Each of the plurality of nodes is unlocked. Updating the data leaf uses a first thread, and searching for the data uses a second thread, the first thread includes a first plurality of nodes in the tree database being different than a second plurality of nodes in the second thread. The tree-structured database is dynamically rebalanced to minimize a time to retrieve the data leaf. Searching for the data leaf includes learning an optimal path between a root node and a result node having the data leaf. Performing a new search comprises searching for the data leaf. Performing a new search comprises searching for a new data leaf. The new search is terminated after exceeding a number of attempts for searching for the data leaf. Searching for the data leaf includes searching for a longest prefix match.

In another embodiment, a method for temporal-miss handling comprises updating a result data leaf included in a plurality of data leaves in a tree-structured database of a communications processor with a plurality of threads. Each of the data leaves is searchable with at least one thread. The plurality of data leaves is less than, or equal to, a total number of data leaves in the tree-structured database. Each of the data leaves is searched by recursively generating at least one search result for each of the data leaves. A sufficiency of a temporal separation, between updating the result data leaf and searching for the result data leaf, to retrieve the data leaf is determined. Each search is cleared when the temporal separation is insufficient. A new search is performed when the temporal separation is insufficient.

Alternative embodiments of the method for temporal-miss handling include one of the following features, or any combination thereof. A valid bit is set to a true state after the temporal separation is sufficient to retrieve the result data leaf. Generating at least one search result includes comparing a sorting key, at one of a plurality of nodes in the tree database, with another sorting key in a subtree of the tree-structured database, wherein each of the plurality of nodes is unlocked. The tree-structured database is dynamically rebalanced to minimize a time to retrieve each of the data leaves. Searching for each of the data leaves includes learning an optimal path between a root node and a result node having the result data leaf. Performing a new search comprises searching for the result data leaf. Performing a new search comprises searching for a new result data leaf. The new search is terminated after exceeding a number of attempts for searching for the result data leaf.

In another embodiment, a system for temporal-miss handling comprises a communications processor. A tree-structured database has a plurality of threads, wherein the communications processor is configured to update a data leaf in the tree-structured database, to search for the data leaf by generating at least one search result for one of the plurality of threads, to determine if a temporal separation between updating the data leaf and searching for the data leaf is insufficient to retrieve the data leaf, to clear each search result when the temporal separation is insufficient, and to perform a new search when the temporal separation is insufficient.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for temporal-miss handling comprising:
   updating a data leaf in a tree-structured database of a communications processor with a plurality of threads;
   searching for the data leaf by generating at least one search result for one of the plurality of threads;
   determining if a temporal separation between updating the data leaf and searching for the data leaf is insufficient to retrieve the data leaf;
   clearing each search result when the temporal separation is insufficient; and
   performing a new search when the temporal separation is insufficient.

2. The method of claim 1 further comprising setting a valid bit to a true state after the temporal separation is sufficient to retrieve the data leaf.

3. The method of claim 1 wherein generating at least one search result includes comparing a sorting key, at one of a plurality of nodes in the tree database, with another sorting key in a subtree of the tree-structured database.

4. The method of claim 3 wherein each of the plurality of nodes is unlocked.

5. The method of claim 1 wherein updating the data leaf uses a first thread, and searching for the data uses a second thread, the first thread including a first plurality of nodes in the tree database being different than a second plurality of nodes in the second thread.

6. The method of claim 1 wherein the tree-structured database is dynamically rebalanced to minimize a time to retrieve the data leaf.

7. The method of claim 1 wherein searching for the data leaf includes learning an optimal path between a root node and a result node having the data leaf.

8. The method of claim 1 wherein performing a new search comprises searching for the data leaf.

9. The method of claim 1 wherein performing a new search comprises searching for a new data leaf.

10. The method of claim 1 wherein the new search is terminated after exceeding a number of attempts for searching for the data leaf.

11. The method of claim 1 wherein searching for the data leaf includes searching for a longest prefix match.

12. A method for temporal-miss handling comprising:
    updating a result data leaf included in a plurality of data leaves in a tree-structured database of a communications processor with a plurality of threads, each of the data leaves searchable with at least one thread, and the plurality of data leaves being less than, or equal to, a total number of data leaves in the tree-structured database;
    searching for each of the data leaves by recursively generating at least one search result for each of the data leaves;
    determining if a temporal separation between updating the result data leaf and searching for the result data leaf is insufficient to retrieve the result data leaf;
    clearing each search having the result data leaf when the temporal separation is insufficient; and
    performing a new search when the temporal separation is insufficient.

13. The method of claim 12 further comprising setting a valid bit to a true state after the temporal separation is sufficient to retrieve the result data leaf.

14. The method of claim 12 wherein generating at least one search result includes comparing a sorting key, at one of a plurality of nodes in the tree database, with another sorting key in a subtree of the tree-structured database, and wherein each of the plurality of nodes is unlocked.

15. The method of claim 12 wherein the tree-structured database is dynamically rebalanced to minimize a time to retrieve each of the data leaves.

16. The method of claim 12 wherein searching for each of the data leaves includes learning an optimal path between a root node and a result node having the result data leaf.

17. The method of claim 12 wherein performing a new search comprises searching for the result data leaf.

18. The method of claim 12 wherein performing a new search comprises searching for a new result data leaf.

19. The method of claim 12 wherein the new search is terminated after exceeding a number of attempts for searching for the result data leaf.

20. A system for temporal-miss handling comprising:
    a communications processor; and
    a tree-structured database having a plurality of threads, wherein the communications processor is configured to update a data leaf in the tree-structured database, to search for the data leaf by generating at least one search result for one of the plurality of threads, to determine if a temporal separation between updating the data leaf and searching for the data leaf is insufficient to retrieve the data leaf, to clear each search result when the temporal separation is insufficient, and to perform a new search when the temporal separation is insufficient.

\* \* \* \* \*